United States Patent [19]

Flint

[11] 4,439,259
[45] Mar. 27, 1984

[54] METHOD OF MAKING LASER FUSION DEBRIS SHIELD

[75] Inventor: Bruce K. Flint, Acton, Mass.

[73] Assignee: Acton Research Corporation, Acton, Mass.

[21] Appl. No.: 432,274

[22] Filed: Oct. 1, 1982

Related U.S. Application Data

[62] Division of Ser. No. 227,984, Jan. 23, 1981, abandoned.

[51] Int. Cl.³ ............................ G02B 1/04; B29G 1/00
[52] U.S. Cl. .................................... 156/245; 264/1.1; 427/164
[58] Field of Search ..................... 156/245; 427/164; 264/1.1

[56] References Cited

U.S. PATENT DOCUMENTS

| | | | |
|---|---|---|---|
| 3,393,035 | 7/1968 | Dobrowolski | 350/318 |
| 4,142,088 | 2/1979 | Hirsch | 219/121 L |
| 4,330,208 | 5/1982 | Gloy | 219/121 LR |

*Primary Examiner*—James R. Hoffman
*Attorney, Agent, or Firm*—James H. Grover

[57] ABSTRACT

A shield for admitting laser beams to a target in a reaction chamber while obstructing exit of target ejected debris from the chamber is formed by coating the opposable faces of two supports with a layer of release agent and a coating protecting the release layer. A bead of transparent epoxy compound is then pressed between the two supports to form an epoxy shield. While the shield is on one support a framing holder is epoxied to the shield.

6 Claims, 7 Drawing Figures

METHOD OF MAKING LASER FUSION DEBRIS SHIELD

This is a division, of application Ser. No. 227,984 filed Jan. 23, 1981 now abandoned.

BACKGROUND OF THE INVENTION

In laser reaction systems a target of selected material, usually in a vacuum chamber, is exposed to one or more high power laser beams for the purpose of inducing a reaction such as thermonuclear fusion. Whether or not such a reaction occurs the radiation power involved (15 to 30 joules per square centimeter) causes the target to eject debris of macroscopic size as well as in sub-molecular size and electromagnetic wave form. Similarly bombardment of targets with other high energy beams such as accelerated particles produces such reaction debris. Escape of such debris from the reaction chamber is undesirable for several reasons including the risk of contamination of very expensive laser optical components between the chamber and the laser.

Plain sheet or film epoxy resin has been sold and has experimentally been found effective as a non-distorting window for high power laser beams and as a shield of laser fusion debris. However, a satisfactory way of mounting thin epoxy films as debris shields has not previously been found, and it is one object of the present invention to provide a way of mounting an epoxy film in a laser or other high energy reaction debris shield. A further object is to provide optically active laser reaction debris shields.

STATEMENT OF INVENTION

According to the invention a method of making a high energy reaction debris shield comprises applying to the opposable faces of two supports a release coat; applying a liquid, transparent epoxy compound on the coat of one support and pressing the two supports face to face to shape an epoxy shield between the faces, and allowing the epoxy to cure; removing at least one support at the release coat and attaching a holder at the periphery of the shield; and removing the protective coat from the shield to form a window optically transparent and physically resistant to the high energy to and physically obstructive of reaction debris.

Further according to the invention a high energy reaction debris shield comprises a window of clear epoxy resin compound optically transparent to the high energy and physically obstructive of laser reaction debris, and having at least one optically active, non-planar face such as a converging lens or other lenticular element.

Still further the invention relates to the shield itself with a frame attached to its periphery, particularly a ring attached to a circular epoxy shield.

DRAWING

DESCRIPTION

Figure 1:
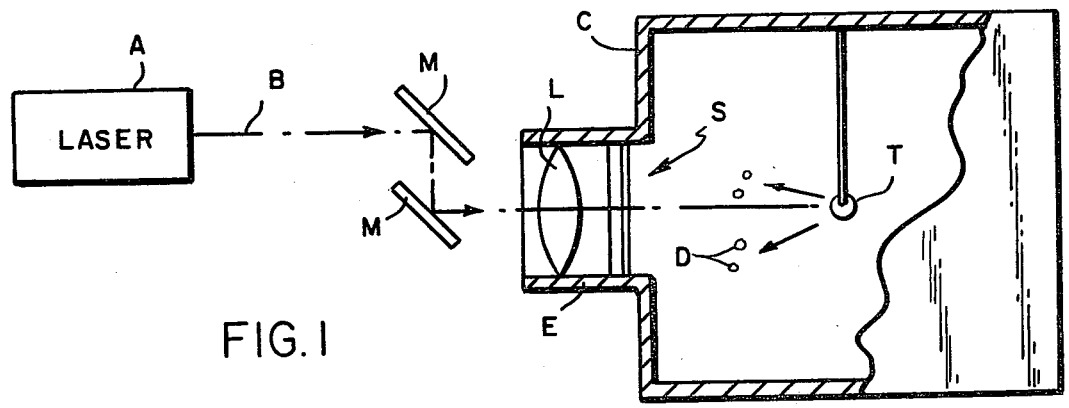
FIG. 1 is a schematic view of a laser fusion system with a shield.
Figure 2:
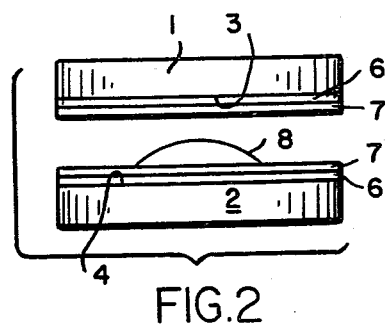
FIGS. 2 to 5 are side elevations showing the steps of making a shield.
Figure 3:
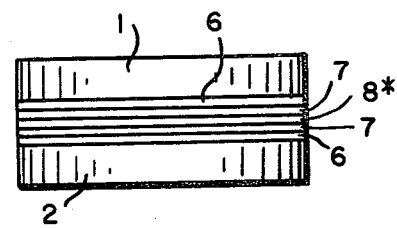

The laser fusion system shown in FIG. 1 comprises a laser A transmitting a coherent beam B of light radiation at 1.06 microns, for example. Other high energy sources such as accelerated particles may be used. The beam is directed into a reaction chamber C, usually evacuated, through an entrance E enclosing a focussing lens L and a shield S which is the subject of this invention, to target T of fusible material, for example. The target T, under the intense power of the laser beam ejects macroscopic fragments D in all directions, the directions indicated by the arrows back toward the entrance E being of concern. The shield S serves to obstruct ejection of this debris out the entrance E as well as admitting the laser beam to the target while maintaining the optical quality of the beam with minimum distortion of the transmitted wavefront.

FIGS. 2 to 6 illustrate the method of making one new form of laser fusion debris shield. Two circular glassy or metal blank supports 1 and 2 have polished, optically flat faces 3 and 4 which are to be opposed. First each face is coated with a layer of release or parting agent 6, typically by vapor deposition, although other techniques, such as spinning, may be used to provide the very uniform film that is required. Then a thin protective film 7 of aluminum, for example, is applied by vapor deposition over the release coat 6 if needed. A thin film of gold may serve as a release and a second film omitted. On the coat 6, 7 of one support 2 is poured a bead 8 of liquid, transparent epoxy compound. A suitable compound is a 10 to 1 viscous mixture of an epoxy resin with terminal epoxide groups and a liquid polyamine curing agent. The prepared face 3 of the other support 1 is then pressed down by its own weight or otherwise, face to face, over the epoxy compound, spreading the epoxy so as to shape a shield disc layer 8* (FIGS. 3 to 6) uniformly a few thousandths of an inch thick (e.g. 0.001 to 0.005). The epoxy shield is then allowed to cure.

Figure 4:
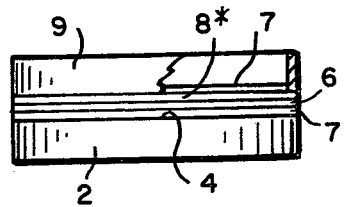

When the epoxy shield is cured the upper blank support 1 is lifted off the shield parting at the upper release layer 6, leaving a film 7 of aluminum over the epoxy shield 8* (FIG. 4). Preferably an annular area around the periphery of the circular shield is cleaned of its exposed aluminum film by abrasion or by a solution of sodium hydroxide and water in the proportion of one cup to five gallons of water. A frame or holder comprising a ring 9 of at least the peripheral dimension (diameter) of the shield is then adhered with epoxy cement to the cleaned peripheral area of the epoxy shield (FIG. 4), preferably while it is still on the lower blank support 2. The ring may be aluminum or other material with a coefficient of thermal expansion close to that of epoxy. When the cement is cured the shield disc 8* and its attached holder 9 are parted from the lower support 2. The remaining protective aluminum film is then removed from the two sides of the epoxy disc leaving the completed shield S. (FIGS. 5 and 6)

A debris shield so made has a high optical quality, passing 1.06 micron laser radiation with a transmitted wave front of one tenth to one half wavelength irregularity. It is of sufficient optical quality and structure to resist damage from the high power density of the laser beam. And with the peripheral support described it is particularly effective to protect the optical elements such as the lens L, the mirrors M and the laser A itself from the fusion debris. The framing ring 9 also facilitates mounting the shield in an optical barrel such as the reaction chamber entrance E.

Figure 5:
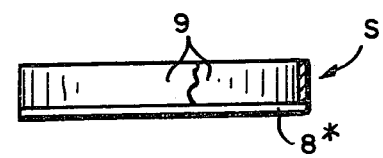
Figure 6:
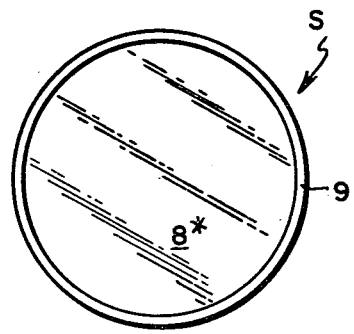
FIG. 6 is a plan view of the shield.
Figure 7:
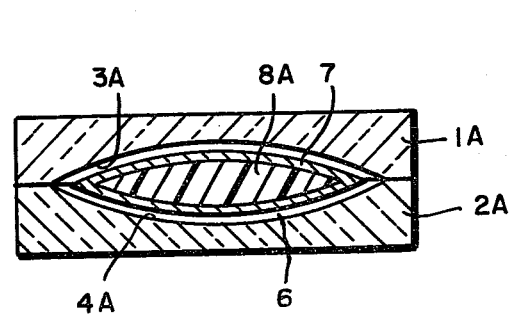
FIG. 7 is a sectional elevation of an alternative form of shield in the process of manufacture corresponding to FIG. 3.

As shown in FIGS. 7 and 8, instead of being the passive plano-plano element of FIGS. 5 and 6, the debris shield may be optically active in the sense of focussing, refracting, collimating, diffracting or similarly controlling an incident light beam. In FIG. 7 the blank supports 1A and 2A, instead of having the optically flat faces 3 and 4 as in FIG. 2, have opposed concave faces 3A and 4A forming a double convex cavity between them. Either of these faces might be planar or concave. Each face has a release layer 6 and a protective layer 7 conforming to the planar or non-planar face of its support. A double convex lenticular epoxy shield 8A formed therein according to the previously described method serves not only as a laser beam window and reaction debris shield but also as a focussing lens, replacing the function of the lens L as well as the shield S in FIG. 1. Such a lenticular shield may be mounted on a ring or otherwise shaped holder as previously described and assembled in an optical barrel like the entrance E to the vacuum chamber of FIG. 1.

It should be understood that the present disclosure is for the purpose of illustration only and that this invention includes all modifications and equivalents which fall within the scope of the appended claims.

I claim:

1. The method of making a high energy reaction debris shield comprising:

applying a release coat to the opposable faces of two supports;

applying a liquid, transparent epoxy compound on the coat of one support and pressing the two supports face to face to shape an epoxy shield between the faces, and allowing the epoxy to cure;

removing at least one support at the release coat and attaching a holder at the periphery of the shield; and removing the release coat from the shield to form a window optically transparent and physically resistant to the high energy and physically obstructive of reaction debris.

2. The method according to claim 1 including the steps of applying a protective film for the release coat prior to applying the epoxy compound, and removing the protective film from at least the periphery of one coat prior to attaching the holder thereto.

3. The method according to claim 1 or claim 2 wherein the holder is attached to the periphery of the shield while the shield is on one support.

4. The method according to claim 1 wherein the face of one support deviates from planar shape.

5. The method according to claim 4 wherein the face of one support is lenticular.

6. The method according to claim 1 wherein the shield is resistant to damage from laser frequency energy.

* * * * *